United States Patent [19]

Hoyt

[11] 4,200,709
[45] Apr. 29, 1980

[54] GAS-SPARGING OF ETHYLENE-VINYL ESTER INTERPOLYMERS TO SUPPRESS DISCOLORATION ON ALCOHOLYSIS THEREOF

[75] Inventor: John M. Hoyt, Cincinnati, Ohio

[73] Assignee: National Distillers and Chemical Corporation, New York, N.Y.

[21] Appl. No.: 954,960

[22] Filed: Oct. 26, 1978

[51] Int. Cl.$^2$ .................................................. C08F 8/12
[52] U.S. Cl. ......................................... 525/62; 525/56
[58] Field of Search ........................................... 526/10

[56] References Cited

U.S. PATENT DOCUMENTS

| 3,513,142 | 5/1970 | Blumberg et al. | 526/10 |
| 3,697,495 | 10/1972 | Bristol | 526/10 |
| 3,985,719 | 10/1976 | Hoyt et al. | 526/10 |

Primary Examiner—Stanford M. Levin
Attorney, Agent, or Firm—Kenneth D. Tremain

[57] ABSTRACT

Process for the production of partially-alcoholyzed ethylene-vinyl ester interpolymers by controlled alcoholysis of the base resins in which discoloration is suppressed by gas-sparging the base polymer in solution prior to alcoholysis.

13 Claims, No Drawings

GAS-SPARGING OF ETHYLENE-VINYL ESTER INTERPOLYMERS TO SUPPRESS DISCOLORATION ON ALCOHOLYSIS THEREOF

This application relates to an improvement in the process for the controlled alcoholysis of ethylene-vinyl ester interpolymers as described, for example, in U.S. Pat. No. 3,985,719. The hydrolyzed resins produced by the present process find particular application as packaging films utilized for wrapping of fresh meat and other food products, as adhesives and for coating applications, especially in powder coating applications.

This invention relates to a process for the alcoholysis of ethylene-vinyl ester interpolymers, and more particularly to an improved process in which discoloration of the hydrolyzed polymers formed therein is inhibited or suppressed whereby to produce substantially colorless resin products particularly suitable for packaging film application.

As described in greater detail in the aforesaid U.S. Pat. No. 3,985,719, a wide variety of processes have heretofore been described for the hydrolysis of ethylene-vinyl ester interpolymers, particularly ethylene-vinyl acetate copolymers, by alcoholysis in hydrocarbon solvent media. It is recognized in the art that hydrolyzates thereby formed are frequently yellowed or otherwise discolored; a number of techniques have accordingly been proposed in the literature for the reduction of such discoloration. Thus, it has been suggested that discoloration of hydrolyzed ethylene-vinyl acetate copolymers may be suppressed or prevented, for example, by saponifying in the presence of one or more ketones or aldehydes, such as methyl ethyl ketone and diethyl ketone (Jap. Pat. No. 74 17,433; Chem. Abstrs. 82:58595g); or by slurrying the saponification reaction mixture with methyl acetate (Jap. Kokai No. 74 23,897; Chem. Abstrs. 81:92400d); or by performing the saponification in a stepwise manner (Jap. Pat. No. 70 34,152; Chem. Abstrs. 74:43131p); or by alcoholysis in the presence of light of certain wavelengths (U.S. Pat. No. 3,882,005).

U.S. Pat. No. 3,513,142 describes the sparging of vinyl acetate monomer, before polymerization, with an inert gas such as nitrogen to reduce the contained oxygen resulting in a vinyl acetate polymer which alcoholyzes to polyvinyl alcohol of reduced discoloration. Preferably the oxygen is reduced to a level of less than 30 and preferably less than 10 parts per million of oxygen in the monomer stream.

It is a principal object of the present invention to provide an improved process for the alcoholysis of ethylene-vinyl ester interpolymers, wherein discoloration of the hydrolyzed products thereby formed is reduced, if not totally inhibited or suppressed.

SUMMARY OF THE INVENTION

In accordance with this invention it has been found that substantially colorless hydrolyzates of ethylene-vinyl ester interpolymers may be produced in the alcoholysis of such polymers in a reaction medium comprising as components thereof the polymer, a low-boiling alcohol, a hydrocarbon solvent and an alkaline or acidic catalyst. In such media, the polymer is usually incorporated in an amount of from about 20 to 50 percent of the aggregate weight of the hydrocarbon solvent and the low-boiling alcohol, and the catalyst is present in an amount of at least 0.1% by weight of the polymer. When such a medium is utilized for the alcoholysis, with the reaction usually being carried out over a period of from about 0.5 to 200 minutes, discoloration of the hydrolysis product is markedly reduced, if not entirely eliminated by sparging the interpolymer solution, before alcoholysis is commenced, with an inert gas preferably air or nitrogen, or mixtures thereof. We have found that, employing this technique, discoloration of the hydrolysis product is suppressed or entirely eliminated, substantially colorless polymers being thereby produced. In general, high color in the reaction medium indicates relatively high color in the hydrolyzed product isolated therefrom. Accordingly, color of the reaction mixture is conveniently taken as a measure of the effect of sparging with gas, the color being measured on an aliquot of the reaction mixture in a suitable color comparator, e.g., Gardner-Hellige Comparator (Hellige Inc., Garden City, N.Y.), on a scale of 1–18 where a color of 1 is lightest and 18 the deepest color. Frequently, products of comparable white color are recovered from reaction mixtures of varying degrees of low color intensity. Usually, such solution color differences can be distinguished visually, although in the Gardner scale they are of the order of 1 or less. When discoloration is present in the reaction mixture, the potential exists for the color being absorbed by the product under some, if not all, conditions.

In the controlled alcoholysis process described in the aforesaid U.S. Pat. No. 3,985,719, hydrolysis products which are substantially free of discoloration are generally produced, notwithstanding the fact that catalyst addition times varying from almost instantaneous addition to addition over the entire alcoholysis reaction period may be utilized therein. In this process copolymer solids concentrations of about 18% by weight are usually employed and although discolored (tan) reaction mixtures are often observed at full hydrolysis, the resulting products are normally recovered without visible discoloration. It has been found, however, that discoloration of the hydrolysis product is particularly likely to occur when utilizing higher reactant concentrations which are of particular interest for commercial operations. Thus, for example, in large scale applications it is desirable to utilize relatively high concentrations of the ethylene-vinyl ester interpolymer and, particularly, high concentrations of catalyst, in order to minimize solvent usage and thereby decrease solvent recycles. The gas sparging process of the present invention finds particular application in such commercially important operations wherein, for example, the ethylene-vinyl ester interpolymer is incorporated in the reaction medium in an amount of from about 20 to 50 percent by weight of the hydrocarbon solvent/low-boiling alcohol mixture, and the catalyst is present in the medium in an amount of at least about 0.1%, and up to as much as 20%, by weight of the resin reacted. Employing these processes it has been found that the process of gas sparging in accordance with the present invention can be used to insure the formation of substantially colorless hydrolysis products.

In accordance with the present invention, prior to any appreciable alcoholysis, the ethylene-vinyl acetate polymer starting material is treated by gas sparging to reduce if not totally eliminate discoloration of the reaction mixture and/or the alcoholysis product. For convenience, it is usually preferred to sparge the organic solvent solution of the polymer, although it is also possible to sparge the entire reaction mixture prior to any appreciable alcoholysis of the substrate polymer. The former embodiment is preferred since the sparging can be conveniently carried out during dissolution of the substrate polymer in the selected organic solvent.

Sparging, as employed herein, connotes the agitation of a liquid system by introduction of gas, usually at a relatively fast rate to cause noticeable agitation of the liquid. Preferably, sparging is usually effected with compressed gas to attain agitation. Thus, the degree of agitation will be controlled by the rate of addition of the gas as well as the degree of compression of the gas. For most purposes, the compression of the gas is conveniently several atmospheres which can be generated using the usual type of laboratory compressor. Alternatively, the normal compressed gas provided in pressure tanks for laboratory use is also conveniently employed in the present process. Thus, the pressure of the gas employed in the sparging step is not critical, as long as it is above atmospheric pressure, and is sufficient to effect agitation of the sparged liquid. The sparging gas then should be at a pressure of at least above one atmosphere and preferably above 10 atmospheres. The maximum pressures are dictated by common sense and good laboratory technique. The preferred range includes from about 15 to about 150 atmospheres.

The gas to be employed in the gas-sparging step of the present process can be any inert gas. As employed herein, "inert" refers to those gases which are substantially unreactive with the reaction components under the sparging conditions employed. Preferably, the gas should not be of appreciable solubility in the solvent system being treated. Thus, gases which are operable include, for example, air, oxygen, nitrogen, helium, argon, carbon dioxide, and similar such gases, alone or as mixtures. Oxygen and air should be used with caution or avoided where the solution solvent may form explosive mixtures therewith. Carbon dioxide should be avoided if sparging is to be effected on the alcoholysis mixture including an alkaline catalyst for the obvious reason that carbon dioxide will react with the alkali. When sparging is effected on the organic solvent solution of the polymer, carbon dioxide can be used since it is inert to the said solution. The preferred gases are nitrogen and air as well as mixtures thereof.

In concurrently filed, commonly assigned U.S. patent application Ser. No. 954,959 filed Oct. 26, 1978 the disclosure of which is incorporated herein by reference, there is described a process of reducing discoloration in alcoholyzed ethylene-vinyl acetate polymers by rapid addition of alcoholysis catalysts at a uniform rate. Such a process results in reduction of the discoloration of the alcoholyzed product, particularly when the alcoholyzed ethylene-vinyl acetate is "weathered-out," i.e., contains less than about 30 ppm of vinyl acetate monomer. Further, freshly synthesized polymers, i.e., containing for example about 0.5% by weight or more of free monomer, tend to become somewhat more discolored upon alcoholysis, possibly because color bodies are produced from the free monomer. Thus, even when treated in accordance with the process of the concurrently filed application Ser. No. 954,959.

The product may be somewhat discolored although not as discolored as would normally result in uncontrolled alcoholysis.

The present process step of gas sparging in combination with the step of rapid addition of catalyst at uniform rate results in even lesser discoloration of the alcoholyzed product.

The exact mechanism by which the present process works is not fully understood particularly in view of the applicability of the gas-sparging process to either "weathered-out" polymer or freshly-prepared polymer. In the latter case, it may be that gas-sparging frees the polymer solution of volatile components, e.g., vinyl acetate monomer, but such explanation may not apply to weathered-out polymer. Regardless of the mechanism, the use of the gas-sparging process of this invention results in desirable lessening of discoloration of alcoholyzed ethylene-vinyl acetate polymers, and usually to almost complete elimination of such discoloration in weathered-out polymers.

PREFERRED EMBODIMENTS OF THE INVENTION

The process of the present invention can be used in the alcoholysis of ethylene-vinyl ester interpolymers containing from about 3 to about 45, and preferably about 15 to about 40, weight percent of the vinyl ester, to effect hydrolysis of from about 5 to 95, preferably from about 40 to 80, mole percent of the vinyl ester content thereof. Most preferably, the gas sparging process is utilized for the reaction of ethylene-vinyl acetate copolymers containing from about 20 to 35 weight percent vinyl acetate to form hydrolysis products having residual vinyl acetate contents of from about 8 to 18 weight percent. Such products are particularly useful as packaging materials for fresh meat and produce, colorless, transparent film being formed therefrom. The use of such a colorless film is highly desirable for customer acceptance and, moreover, obviates the possibility that color bodies produced from prolonged catalyst addition during the hydrolysis may be extracted by the meat and produce to be wrapped and have a possibly deleterious physiological reaction on the ultimate consumer.

The present invention embraces the use of the gas-sparging step with any solution alcoholysis procedure involving the use of solutions of the ethylene-vinyl ester interpolymer. In a particularly preferred embodiment of the invention, the alcoholysis is carried out in a reaction medium in which the polymer to be hydrolyzed is dissolved in a mixture of a low-boiling alcohol and a hydrocarbon solvent in a concentration of from 20 to 50, preferably from about 22 to 40 weight percent of such mixture. The hydrocarbon and the low-boiling alcohol are suitably admixed in the reaction medium in the volumetric proportion of hydrocarbon solvent to alcohol of from 1:5 to 10:1, preferably from 1:1 to 5:1 (i.e., from 1 to 5 parts by volume of the alcohol per part of the hydrocarbon). The alkaline or acidic catalyst for the alcoholysis reaction is incorporated in the reaction medium in an amount of at least about 0.1% by the reaction medium in an amount of at least about 0.1% by weight of the ethylene-vinyl ester interpolymer to be hydrolyzed, preferably in the proportion of 1:1000 to 1:5 (0.1% to 20%), and, most desirably, from 1:200 to 1:25 (0.5% to 4%) parts by weight of the resin.

The ethylene-vinyl ester interpolymers, hydrocarbon solvents, low-boiling alcohols and alkaline or acidic catalysts which may be incorporated in the reaction medium utilized in the alcoholysis process hereof may comprise any of those materials more fully described in the aforesaid U.S. Pat. No. 3,985,719 incorporated herein by reference for such disclosure. Thus, while the invention is principally described in connection with the alcoholysis of ethylene-vinyl acetate copolymers, it should be understood that the process is similarly applicable to the alcholysis of other ethylene-vinyl ester interpolymers as defined in the aforesaid patent. Similarly, while it is preferred to employ methanol as the low-boiling alcohol, benzene or toluene as the hydrocarbon solvent, and an alkali metal hydroxide or alkoxide (most preferably sodium hydroxide or sodium methoxide) as the alcoholysis catalyst, it will be understood that other materials within the scope of U.S. Pat. No. 3,985,719 may similarly be employed in the practice hereof.

It is further preferred to control the water level of the components of the alcoholysis reaction medium in the manner disclosed in U.S. Pat. No. 3,985,719. Preferably, the aggregate initial amount of water contained in the ethylene-vinyl ester polymer, the hydrocarbon solvent, the low-boiling alcohol, the sparge gas and the catalyst components of the reaction medium is limited to no more than about 10% of the total weight of the medium. During the reaction, the water content of any additional portions of such components introduced for reaction is regulated as not to vary by more than about 50% by weight of the initial aggregate water content thereof. As further described in the aforesaid patent, the reaction medium is desirably maintained throughout the reaction under a dry, inert atmosphere and the alcoholysis is otherwise carried out under conditions preventing the addition or loss of substantial quantities of water to or from the medium.

The alcoholysis reaction is carried out at temperatures of from about 10° to 250° C., preferably from about 30° to 100° C. Under these conditions, the desired partial hydrolysis of the ethylene-vinyl ester interpolymer is effected within a reaction time of from about 0.5 to 200 minutes, preferably from about 15 to 60 minutes.

In accordance with a preferred form of the invention, when the alcoholysis reaction is performed in accordance with the preceding parameters, the alcoholysis catalyst is added to the reaction medium during the reaction within a period of from about 0.1 to 20 minutes, preferably within an addition time of from at least about one minute and most preferably from about one to 10 minutes. It is important that the catalyst not only be rapidly added to the reaction medium but that it be added at a substantially uniform rate.

The following examples illustrate particularly preferred embodiments of the present invention. The experiments reported herein were carried out with "weathered-out" ethylene-vinyl acetate copolymers containing only traces of free vinyl acetate monomer (e.g., less than about 30 ppm) and freshly synthesized ethylene-vinyl acetate copolymers, containing about 0.5 weight percent or more free monomer, which also become discolored upon alcoholysis, apparently because of color bodies produced from the free monomer.

In the following examples all parts and percentages are given by weight and all temperatures are expressed in degrees Celsius, unless otherwise indicated.

The actual procedure of sparging with gas, as previously pointed out, is not overly critical as long as the treated liquid solution of polymer is sufficiently agitated. Even only slight degrees of agitation will result in some degree of improvement in discoloration of the alcoholyzed product. To determine the required rate and time of sparging to attain a desired result is merely a matter of experimental determination. For example, sparging at a rate of about 195 liters of gas per liter of solution per hour for about 2.5 hours is effective in rendering the alcoholyzed product colorless when the copolymer contains 0.76% of vinyl acetate monomer whereas the product would be slightly discolored at the rate of 24 liters/hr/liter of solution. For most purposes, a sparging rate of at least about 30 liters/hour is effective in reducing color in the alcoholyzed product. Sparging rates in excess of about 100 liters per liter of solution per hour are usually preferred, and are quite practical to obtain a product which is usually colorless or only slightly discolored. The use of substantially higher sparging rates, say above 500 liters per hour, may be required for special cases but is generally not necessary, and not economical or practical for handling purposes. Other factors must also be considered, e.g., mechanical stirring, point of entry of the gas stream, number of inlet ports, etc.

Where control of the water content of the alcoholysis mixture is desired, the sparging gas is usually dried prior to use.

The following examples further illustrate the invention.

EXAMPLE 1

This example is illustrative of the fact that, in the solution alcoholysis of a "weathered-out" high-pressure process ethylene-vinyl acetate copolymer, i.e., one containing low levels of residual unpolymerized vinyl acetate monomer, discoloration produced in the reaction mixture and reflected in the alcoholyzed polymer product can be significantly suppressed if, before contact with the catalyst, the copolymer solution is sparged with a gas such as nitrogen or air. Further, it is shown that such sparging can substantially offset the discoloration associated with slow catalyst adddition.

Control Experiment

Under a nitrogen atmosphere, 125 g of an ethylene-vinyl acetate copolymer prepared by high pressure polymerization and containing 27.0 weight percent of combined vinyl acetate by saponification and less than 15 ppm of free vinyl acetate by gas-liquid chromatographic analysis was added over 0.5 hr to 425 ml of toluene (202 ppm $H_2O$) with heating at 95° C. and stirring. The mixture was heated and stirred for 0.5 hr longer, when solution of the copolymer was complete. The temperature of the solution was adjusted to 65° C., whereupon 85 ml of catalyst solution containing 1.1 g of sodium hydroxide was added over 30 minutes with stirring, i.e., slow addition of catalyst was employed, in accordance with copending and commonly assigned application Ser. No. 954,959 of Hardy et al. incorporated by reference herein. The catalyst solution had been prepared by dissolving 4.4 g of sodium hydroxide in 340 ml of methanol (640 ppm $H_2O$). The reaction was stirred and heated for an additional hour at reflux (65° C.). The color of the solution was determined during and at the end of the one-hour period by withdrawing small samples and measuring their color with a Gardner-Hellige Varnish Comparator.

Glacial acetic acid (2.6 ml) was then added to destroy any remaining catalyst. Thereafter the alcoholyzed product was precipitated with 350 ml of methanol and collected by filtration. The filter cake was washed twice with 100 ml portions of methanol and dried. Results appear in Table I.

Sparging Experiments

The control experiment was repeated except that air or nitrogen was sparged through the copolymer solution and the methanolic sodium hydroxide catalyst solution before they were brought together. The air was dried before use by passage through a tube containing Drierite. In the experiment with air, the entire reaction was conducted under an air atmosphere.

Solutions that had been sparged with either air or nitrogen developed significantly less color during the reaction. These differences are qualitatively reflected in the color of the product. Surprisingly, air appeared to be more effective than nitrogen in suppressing color in the product, after a relatively brief sparging period.

ation of the reaction mixture and permitted a white product to be obtained under otherwise similar conditions (Experiment 2, Table 2). Copolymers with an even higher free vinyl acetate level (0.76%, Experiment 3) also yielded a colorless product when nitrogen-sparging was employed. When, however, a larger reaction volume and a slower nitrogen sparge rate were employed (Experiment 4), serious discoloration of the reaction mixture and the product were encountered. This result indicates the need for a certain minimum amount of sparging, which will vary with conditions and must be

TABLE I

| | Sparging Conditions | | Color of Final Reaction Mixture[1] | | Product | | |
|---|---|---|---|---|---|---|---|
| Expt. No. | Sparge Gas | Point and Time of Application | Visual | Gardner No. | Amount Recovered, g. | Residual VA, Wt. % | Appearance |
| 1 | None | — | Tan | 3 | 111.6 | 9.5 | Light Tan |
| 2 | Air | EVA solution, 95° C., 10 min. Catalyst solution, 10 min | Faint Tan | <1 | 111.9 | 8.9 | Off White |
| 3 | Nitrogen | EVA solution, 90–96° C., 2 hr | Tan | <1 | 105.1 | 9.0 | Slightly tan |

[1]Measured at end of 1 hr reaction period before adding acetic acid.

established empirically.

TABLE 2

| | EVA Copolymer | | | | | Catalyst | Color of Reaction | | Product | | |
|---|---|---|---|---|---|---|---|---|---|---|---|
| | VA | Free VA | | N2 Sparge[1] | | Addition | Mixture[2] | | Amount | Residual | |
| Exp. No. | Content, Wt.% | Monomer, Wt.% | Scale[3] | Rate[4] | Duration, Hours | Time Min. | Visual | Gardner Color | Recoverd g. | VA Wt.% | Appearance |
| 1(77) | 26.5 | 0.37 | 0.5 | None | None | 5 | Yellow-Brown | 2 | — | 11.6 | Slightly Discolored |
| 2(75) | 26.5 | 0.37 | 0.5 | 504 | 1 | 5 | None | — | — | 9.6 | White |
| 3(82) | 31.5 | 0.76 | 1 | 83 | 2.5 | 4 | Very Faint Tan | — | 109 | 11.6 | White |
| 4(80) | 31.5 | 0.76 | 3 | 30.2 | 2.3 | 11 | Yellow Brown | 5 | 332.1 | 11.7 | Yellow-brown |

[1]Sparge applied during dissolving of resin in toluene at 90–95° C., until the solution is cooled to 65° C.
[2]Final color at end of one hour reaction period, before adding acetic acid.
[3]Based on amounts used in Example 1.
[4]Liters of gas/liter of solution/hr.

EXAMPLE 2

Following the same general procedure described in Example 1, nitrogen was tested as a sparging gas to suppress discoloration in the alcoholysis of freshly-synthesized ethylene-vinyl acetate copolymers made by the high pressure copolymerization process. Such copolymers contain relatively high levels of free, unpolymerized vinyl acetate monomer, of the order of several tenths of one percent. Independent experiments have shown that vinyl acetate monomer added during the alcoholysis of weathered-out copolymer increases discoloration. However, it is not known whether the monomer is the only color precursor in either weathered-out or freshly-synthesized resin.

In the experiments included in this example, the amounts of materials used were one-half, one and three times those given in Example 1. This was done to study the effect of the size of the liquid mass to be sparged. In addition, the nitrogen flow rates were varied. Table 2 summarizes the the individual experiments.

Even when a rapid catalyst addition time was employed, e.g., five minutes, distinct discoloration was observed in the reaction mixture and the product of alcoholysis of these freshly-synthesized copolymers (Experiment 1, Table 2). However, vigorous sparging of the copolymer solution with nitrogen before introduction of the catalyst completely suppressed discolor-

What I claim is:

1. In the process for the alcoholysis of an ethylene-vinyl ester interpolymer in a reaction medium comprising as components thereof said interpolymer, a low-boiling alcohol, a hydrocarbon solvent and an alkaline or acidic catalyst, wherein the interpolymer is incorporated in the reaction medium in an amount of from about 20 to about 50 percent by weight of the hydrocarbon solvent and low-boiling alcohol the improvement of which comprises sparging the said interpolymer in solution in said solvent prior to alcoholysis with inert gas to obtain an alcoholyzed product of reduced discoloration.

2. A process according to claim 1 wherein the ethylene-vinyl ester interpolymer reacted contains from 3 to 45 weight percent of the vinyl ester, and wherein from 5 to 95 mole percent of said ester is hydrolyzed during the reaction.

3. A process according to claim 1 wherein the hydrocarbon solvent and low-boiling alcohol are incorporated in the alcoholysis reaction medium in the proportion of from about 1:5 to about 10:1 parts by volume, and the reaction is carried out at a temperature of from about 10° to about 250° C.

4. A process according to claim 1 wherein the ethylene-vinyl ester interpolymer alcoholyzed is a freshly synthesized resin containing at least about 0.5 weight percent free vinyl ester monomer.

5. A process according to claim 1 wherein the said interpolymer is a resin containing less than about 30 ppm of free vinyl ester monomer.

6. A process according to claim 1 wherein the ethylene-vinyl ester interpolymer alcoholyzed is an ethylene-vinyl acetate resin containing from about 15 to about 40 weight percent vinyl acetate; the reaction mixture contains from about 20 to about 35 weight percent of the ethylene-vinyl acetate resin in the hydrocarbon solvent and alcohol, the hydrocarbon solvent is incorporated in the reaction medium in an amount of from about one to about five parts by volume per part of the low-boiling alcohol and the catalyst is an alkali metal hydroxide or alkoxide and is incorporated in the reaction medium in an amount of from about 0.5 to about 4 percent by weight of the ethylene-vinyl acetate copolymer.

7. A process according to claim 6 wherein the alcoholysis reaction is carried out at temperatures of from 30° to 100° C. over a period of from 15 to 60 minutes.

8. A process according to claim 7 wherein the catalyst is added to the reaction medium during the reaction within a period of from one to 10 minutes at a substantially uniform rate varying no more than ±10% over the period of addition.

9. A process according to claim 1 wherein the sparging gas is air or nitrogen or mixtures thereof.

10. In the process for the alcoholysis of an ethylene-vinyl ester interpolymer in a reaction medium comprising as components thereof said interpolymer, a low-boiling alcohol, a hydrocarbon solvent and an alkaline or acidic catalyst, wherein the interpolymer is incorporated in the reaction medium in an amount of from about 20 to about 50 percent by weight of the hydrocarbon solvent and low-boiling alcohol while adding the catalyst to the alcoholysis reaction medium during the reaction within a period of from about 0.1 to about 20 minutes at a substantially uniform rate the improvement which comprises sparging the said interpolymer in solution in said solvent prior to alcoholysis with inert gas to obtain an alcoholyzed product of reduced discoloration.

11. A process according to claim 10 wherein the ethylene-vinyl ester interpolymer reacted contains from 3 to 45 weight percent of the vinyl ester, and wherein from 5 to 95 mole percent of said ester is hydrolyzed during the reaction.

12. A process according to claim 10 wherein the hydrocarbon solvent and low-boiling alcohol are incorporated in the alcoholysis reaction medium in the proportion of from about 1:5 to about 10:1 parts by volume, and the reaction is carried out at a temperature of from about 10° to about 250° C.

13. A process according to claim 10 wherein the sparging gas is air or nitrogen or mixtures thereof.

* * * * *